United States Patent
Vashisht et al.

(10) Patent No.: US 11,164,577 B2
(45) Date of Patent: Nov. 2, 2021

(54) CONVERSATION AWARE MEETING PROMPTS

(71) Applicant: Cisco Technology, Inc., San Jose, CA (US)

(72) Inventors: Vikas Vashisht, Morrisville, NC (US); Michael A. Ramalho, Lakewood Ranch, FL (US); Mihailo Zilovic, Lawrenceville, NJ (US); Dario De Santis, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 130 days.

(21) Appl. No.: 16/255,449

(22) Filed: Jan. 23, 2019

(65) Prior Publication Data

US 2020/0234696 A1    Jul. 23, 2020

(51) Int. Cl.
| | | |
|---|---|---|
| G10L 15/22 | (2006.01) | |
| G10L 15/18 | (2013.01) | |
| G10L 15/24 | (2013.01) | |
| G10L 15/08 | (2006.01) | |

(52) U.S. Cl.
CPC .............. *G10L 15/22* (2013.01); *G10L 15/18* (2013.01); *G10L 15/24* (2013.01); *G10L 2015/088* (2013.01); *G10L 2015/223* (2013.01)

(58) Field of Classification Search
CPC ..... G10L 15/26; G10L 15/22; G10L 15/1815; G10L 15/183; G10L 15/18; G10L 15/1822; H04L 65/403; G06F 40/30
See application file for complete search history.

(56) References Cited

U.S. PATENT DOCUMENTS

| | | | |
|---|---|---|---|
| 8,121,653 B2 | 2/2012 | Marti et al. | |
| 9,037,455 B1 | 5/2015 | Faaborg et al. | |
| 10,505,998 B1* | 12/2019 | Ackerman | ............. H04N 7/152 |
| 2003/0167167 A1 | 9/2003 | Gong | |
| 2008/0096533 A1 | 4/2008 | Manfredi et al. | |
| 2009/0044132 A1* | 2/2009 | Combel | ............... G06Q 10/107 |
| | | | 715/753 |
| 2010/0037151 A1* | 2/2010 | Ackerman | ........... H04L 65/4015 |
| | | | 715/753 |
| 2012/0030682 A1* | 2/2012 | Shaffer | .............. H04N 21/2381 |
| | | | 718/103 |
| 2014/0282003 A1* | 9/2014 | Gruber | .................... G06F 3/165 |
| | | | 715/727 |
| 2014/0362165 A1* | 12/2014 | Ackerman | .......... H04L 65/4076 |
| | | | 348/14.07 |
| 2018/0098030 A1* | 4/2018 | Morabia | ............. H04L 65/1089 |
| 2019/0132265 A1* | 5/2019 | Nowak-Przygodzki | ..................... |
| | | | G06Q 10/1093 |
| 2019/0279164 A1* | 9/2019 | Byron | ................. G06F 16/2457 |

(Continued)

OTHER PUBLICATIONS

Marti,"Autonomous Interactive Intermediaries: Social Intelligence for Mobile Communication Agents," http://alumni.media.mit.edu, Jun. 2005, pp. 1-167.

*Primary Examiner* — Mark Villena
(74) *Attorney, Agent, or Firm* — Polsinelli PC

(57) ABSTRACT

The present technology pertains to a voice assistant configured for use in a meeting room environment where the voice assistant can learn speech parameters for a meeting taking place in the meeting room environment. The voice assistant can use the speech parameters to deliver proactive notifications in a manner that is less intrusive to the conversation in the meeting.

20 Claims, 5 Drawing Sheets

(56) References Cited

U.S. PATENT DOCUMENTS

| | | | |
|---|---|---|---|
| 2019/0341050 A1* | 11/2019 | Diamant | H04N 7/15 |
| 2020/0084056 A1* | 3/2020 | Deluca | H04L 12/1818 |
| 2020/0134211 A1* | 4/2020 | Miller | H04W 12/02 |
| 2020/0186482 A1* | 6/2020 | Johnson, III | G06Q 10/107 |

* cited by examiner

US 11,164,577 B2

CONVERSATION AWARE MEETING PROMPTS

TECHNICAL FIELD

The present technology pertains to delivering prompts to a user engaged in a conversation, and more specifically pertains to a conference virtual assistant that delivers meeting prompts during conversations in the meeting environment.

BACKGROUND

Virtual assistants are becoming more prevalent. Most smart phones have a virtual assistance, and desk/counter top virtual assistants are becoming more popular. Conference systems also include virtual assistants. While these virtual assistants can provide helpful prompts and other timely information, they can be disruptive.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology pertains to a voice assistant that monitors a meeting environment. The voice assistant can analyze a conversation occurring in the meeting environment to determine speech parameters for in the conversation among the participants of the conversation, and adjust default conversational speech parameters of the voice assistant based on the determined speech parameters. The voice assistant can detect a notification trigger corresponding to a notification to be spoken by the voice assistant, determine that the notification to be spoken is of normal importance, and speak the notification according to the conversational speech parameters as adjusted based on the determined speech parameters.

Example Embodiments

The disclosed technology addresses the need in the art for a virtual assistant that is useful while not being obtrusive to an ongoing conversation. This is especially needed in the context of a virtual assistant used in meeting rooms (both physical and virtual). In order to be useful while not being obtrusive, a voice assistant needs to be able to provide prompts that fit with the dynamics of an ongoing conversation.

Current voice assistants that assist in meeting rooms do not currently possess the intelligence needed to learn the dynamics of an ongoing conversation and apply such learning. Therefore, current voice assistants are mostly reactive in nature—they respond to commands and requests directed to them from a human operator. Voice assistants that are specific to meeting environments are not proactive because they risk disrupting on going meetings. However, a voice assistant of the present technology, which is configured to assist in meeting rooms and can learn the dynamics of a conversation and apply such learning, can provide proactive prompts and information in a non-intrusive (or at least less-intrusive) manner.

Figure 1:
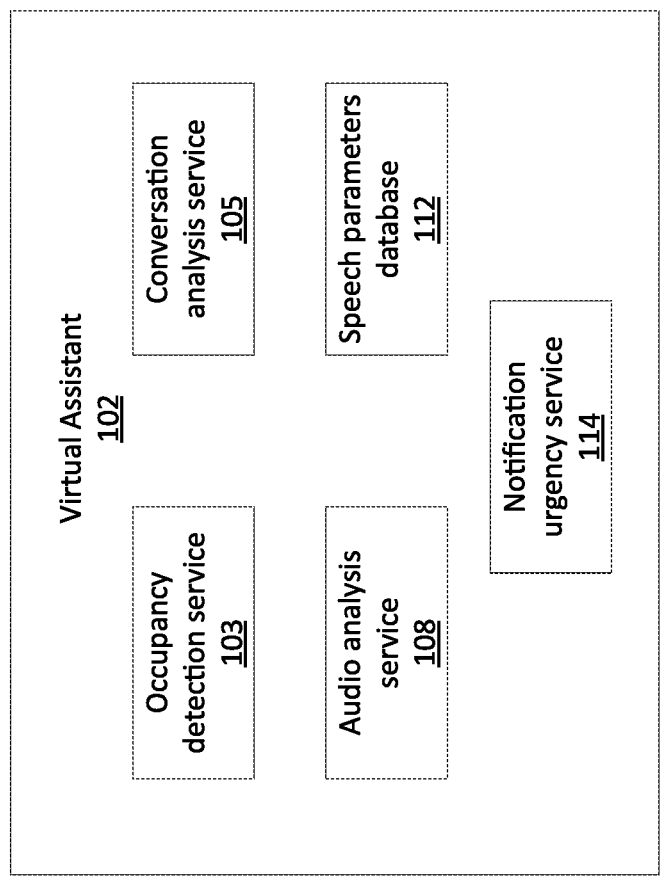
FIG. 1 illustrates an example configuration of a virtual assistant in accordance with some embodiments of the present technology.

FIG. 1 illustrates an example virtual assistant 102 in accordance with the present technology. Virtual assistant 102 is capable of monitoring a meeting environment for the presence of meeting participants and to analyze conversation occurring in the meeting environment to determine speech parameters of the conversation, and to use learned speech parameters to provide notifications in a natural and nonintrusive manner.

Virtual assistant 102 includes occupancy detection service 103 which is configured to determine when a meeting participant is present in a meeting environment. The meeting environment can be a physical conference room or can be a virtual meeting environment such as provided by various online and telephone conference platforms. Occupancy detection service 103 can be a type of passive sonar service wherein a microphone of occupancy detection service 103 can detect noises associated with the presence of a meeting participant. For example in the physical environment, noises can include noises associated with footsteps, closing of the door, shuffling of papers, placing something on the table, someone sitting down, people talking to each other, etc. In a virtual meeting environment noises can include noises associated with a person introducing himself, background typing noises, person clearing their throat, breathing etc. In some embodiments, occupancy detection service 103 can also utilize video inputs from video cameras in a conference room or a personal computing device.

Virtual assistant 102 can also include a conversation analysis service 105. Conversation analysis service 105 is configured to determine speech parameters for a conversation taking place in the meeting environment. The speech parameters include metrics such as:

number of speakers in the conversation,
  average length of pause between sentences in the conversation,
  average length of pause between sentences by a specific participant in the conversation,
  average length of pause between speaker shifts in the conversation, average length of pause after a specific participant in the conversation stops speaking,
speaking rate (words per minute),
loudness of speech,
etc.

Virtual assistant 102 can also include a speech parameters database 112 which can store default speech parameters to be used by the virtual assistant 102 at times when conversation analysis service 105 has not had an opportunity to determine speech parameters for the specific conversation taking place in the meeting environment. The speech parameters specific for the conversation taking place in the meeting environment can also be stored in speech parameters database 112 as they are output by conversation analysis service 105. Speech parameters specific for the conversation are preferred over the default parameters.

In some embodiments, virtual assistant 102 can include an audio analysis service 108. Audio analysis service 108 can be configured to analyze the content of the conversation taking place in the meeting environment and learn cues that may indicate a sentence is coming to an end, or that a speaker shift is imminent.

Virtual assistant 102 can also include a notification urgency service 114. Notification urgency service 114 can determine a relative urgency of a notification. For example a notification may be deemed urgent, in which case notification urgency service 114 would immediately interject the notification into the conversation taking place in the meeting environment. A notification may be deemed not urgent, in which case notification urgency service 114 might wait for a speaker shift or a significant pause in conversation. A notification may be deemed normal urgency, in which case notification urgency service 114 might wait only until the end of a sentence before speaking. Notification urgency service 114 can include various rules for determining a urgency of a notification, and for deciding when the notification should be delivered.

Figure 2:
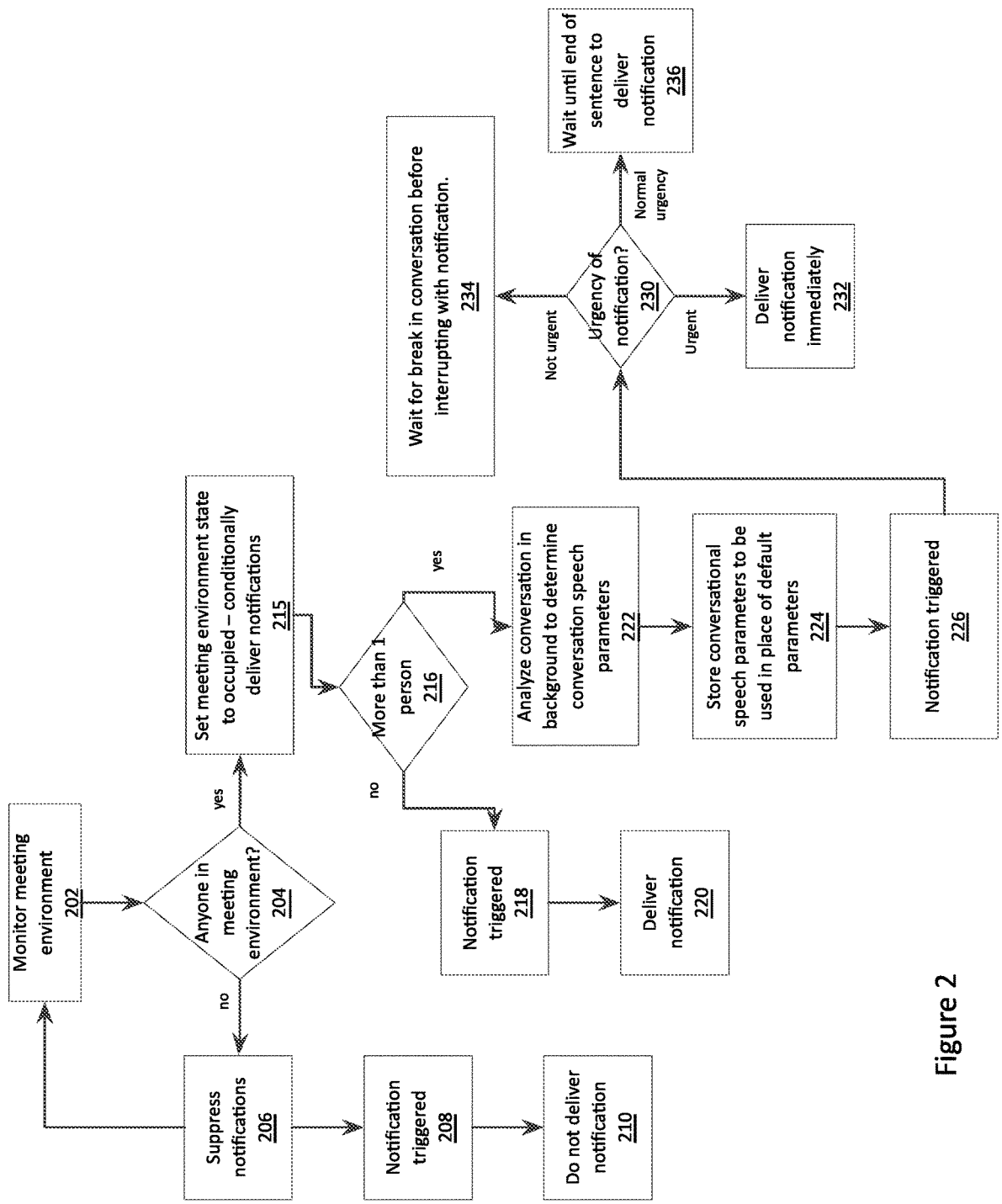
FIG. 2 illustrates and example method embodiment in accordance with some embodiments of the present technology.

FIG. 2 illustrates an example method in accordance with some embodiments of the present technology, and can be carried out by virtual assistant 102. As illustrated in FIG. 2 occupancy detection service 103 of virtual assistant 102 can monitor (202) a meeting environment. If there is no participant present (204) in the meeting environment any notifications can be suppressed (206) since there is no meeting participant to be informed by the notification. Furthermore delivering notifications when not needed can be disturbing to people nearby a meeting environment and can be a waste of resources by virtual assistant 102.

In some embodiments, virtual assistant 102 can remain in a low-power mode with notifications suppressed (206) until occupancy detection service 103 determines the presence of a meeting participant and wakes virtual assistant 102. When notifications are suppressed (206) and a notification is triggered (208), virtual assistant 102 will not speak the notification (210). For example, virtual assistant 102 may have access to an electronic calendar for the meeting environment, and electronic calendar can trigger a notification (208) that a meeting is to start and five minutes. However when no one is present in the meeting environment there is no need to deliver the notification.

As referred to herein, delivery of a notification can most often refer to virtual assistant 102 playing the notification out loud using speakers, but in some embodiments can also refer to presenting the notification visually, providing tones or vibrations, or a combination of these mechanisms.

When occupancy detection service 103 detects a meeting participant in the meeting environment (204) it can set the meeting environment state to occupied (215).

In some embodiments, occupancy detection service 103 can determine whether there is more than one person in the meeting environment (216). When only one person is present in the meeting environment virtual assistant can respond to a triggered notification (218) by delivering the notification (220) without further analysis of the meeting environment since no conversation will be interrupted.

However when occupancy detection service 103 determines (216) that more than one participant is present in the meeting environment, conversation analysis service 105 can analyze a conversation between the meeting participants to determine (222) conversation speech parameters. As conversation analysis service 105 determines the speech parameters it can store (224) the speech parameters in speech parameters database 112 to be used in place of any default parameters.

When a notification is triggered (226) virtual assistant 102 can determine the urgency of the notification (230) using notification urgency service 114.

When notification urgency service 114 determines (230) that the triggered notification (226) is urgent, virtual assistant 102 can immediately deliver the notification (232). An example of an urgent notification might be that a building alarm, such as a fire alarm, has been triggered. Notification urgency service 114 can include rules that dictate that an urgent notification should immediately be delivered irrespective of whether the notification would interrupt the ongoing conversation.

When notification urgency service 114 determines (230) that a notification is not urgent, notification urgency service 114 can instruct the virtual assistant 102 to wait for a break in the conversation before interrupting with the notification (234). An example of a non-urgent notification would be a notification that the meeting environment is scheduled for another meeting in 15 minutes. For such a notification, virtual assistant will utilize the speech parameters in speech parameters database 112 to help determine a breakpoint in the conversation. For example, virtual assistant 102 may wait until a longer than average pause in the conversation takes place before injecting with the notification.

When notification urgency service 114 determines (230) the notification is of normal urgency, notification urgency service 114 can instruct virtual assistant 102 to wait until the end of a sentence to deliver the notification (236). An example of a normal notification might be that a new meeting participant is waiting in a virtual lobby to be added to the meeting environment. For such a notification virtual assistant 102 will utilize speech parameters in speech parameters database 112 to identify or to anticipate the end of a sentence to deliver a notification.

In some embodiments a non-urgent notification can become a normal urgency notification when the non-urgent notification has not been delivered for a period of time. A non-urgent notification might not be delivered for a period of time when a condition for delivering a non-urgent notification has not occurred. For example, the above referenced non-urgent notification that another meeting is to occur in the meeting environment in 15 minutes, might be elevated to a normal urgency notification when the notification has not been delivered for a period of time because there has not been a suitable break in the conversation for delivering a non-urgent notification.

In some embodiments, conversation analytics service 105 can determine that the dynamics of a particular conversation are such that there is rarely any pause to allow speakers to shift. Some conversations are characterized by speakers beginning to speak before the current speaker has finished. In such embodiments, conversation analytics service 105 can provide a negative value into the speech parameters database 112 to cause virtual assistant to start delivering a notification prior to allowing a current speaker to finish. While this behavior would be undesirable in many conversations, it would be desirable in some conversations such as the one characterized above.

Figure 3A:
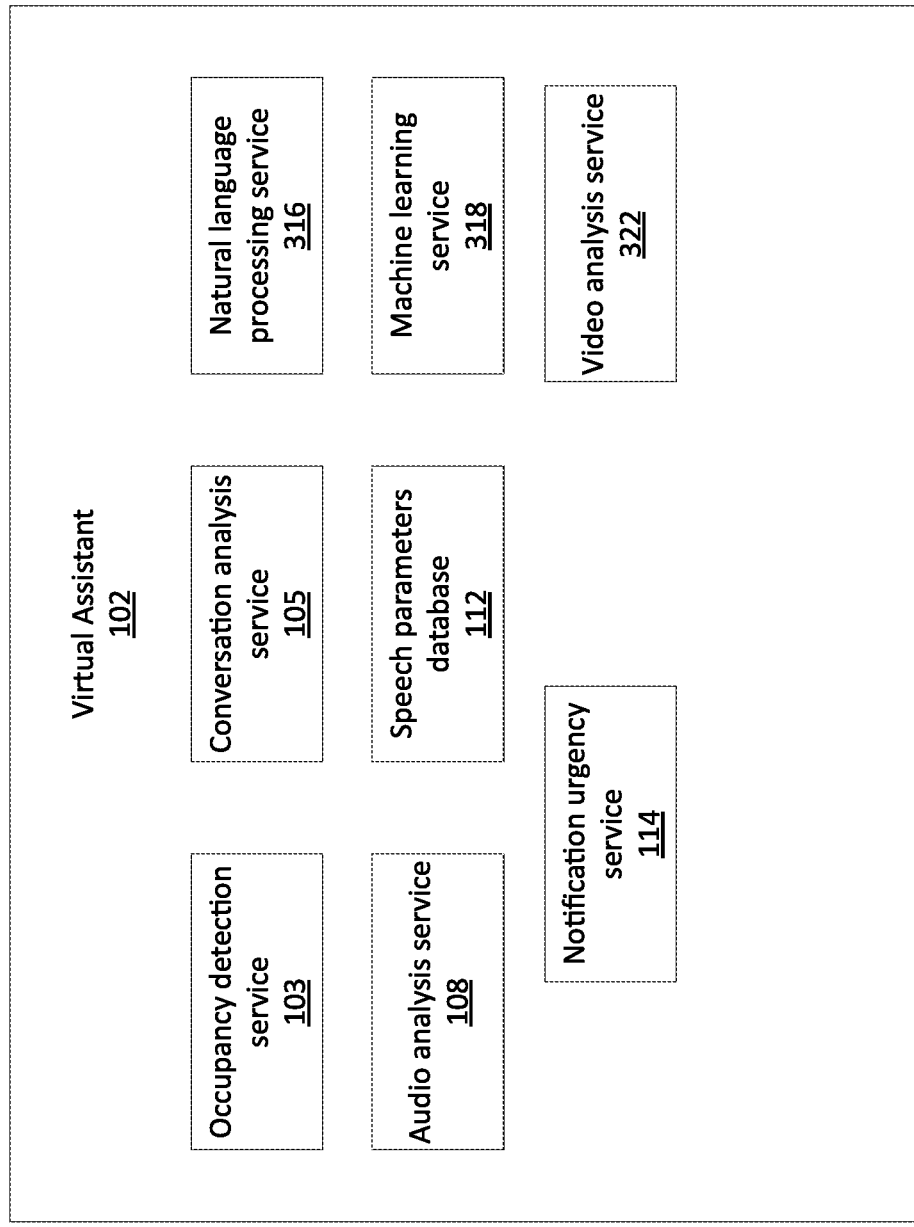
FIG. 3A and FIG. 3B illustrate example configurations of a virtual assistant in accordance with some embodiments of the present technology.
Figure 3B:
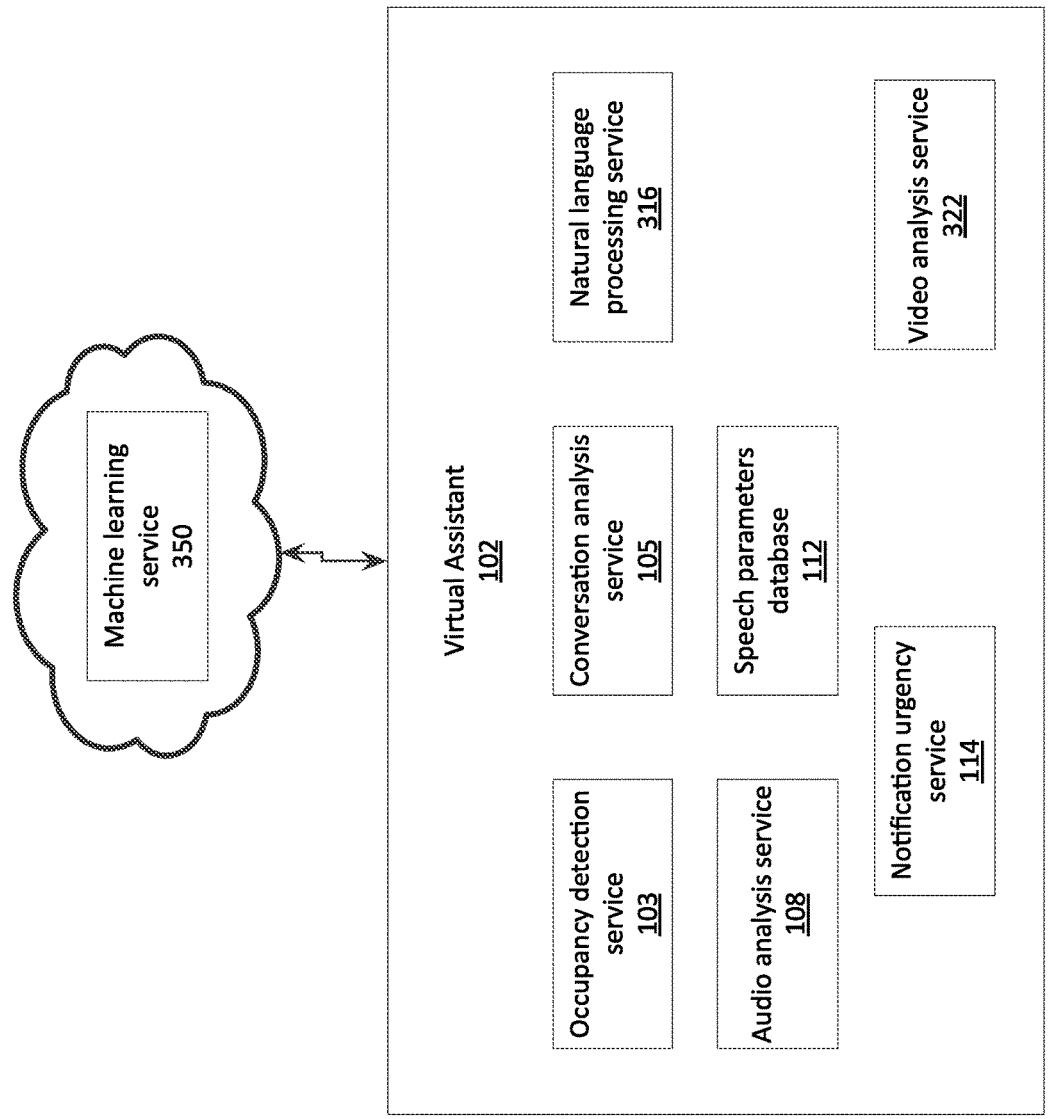

FIG. 3A and FIG. 3B illustrate further examples of the virtual assistant 102 having additional services and capabilities.

For example in FIG. 3A virtual assistant 102 includes a machine learning service 318, while FIG. 3B shows machine learning service 350 in a cloud. Currently, most virtual assistants don't have access to enough data or enough computing resources to perform high quality machine learning and therefore a virtual assistant could be configured as shown in FIG. 3B, but as technology improves it would be desirable to locate a machine learning service within or local to virtual assistant 102 as shown in FIG. 3A. Another factor in the location of the machine learning service is also dependent on whether a privacy policy authorizes data about a conversation to be sent into a cloud for analysis.

Machine learning service 318 or machine learning service 350 can be used to better learn when it is most appropriate to deliver notifications into a meeting environment. While the description above with respect to FIG. 1 and FIG. 2 were focused on pauses between sentences and speaker changes, etc., a machine learning service could learn of a more refined methodology for delivering notifications that are non-urgent or normal-urgent.

As illustrated in FIG. 3A and FIG. 3B, virtual assistant 102 can also include a natural language processing service 316. Natural language processing service 316 can analyze the content of the conversation in the meeting space. In some embodiments, natural language processing service 316 can be used to recognize when a sentence might be coming to an end and alert the notification urgency service of the end of a sentence before any substantial delay has passed.

As illustrated in FIG. 3A and FIG. 3B, virtual assistant 102 can include a video analysis service 322. Video analysis service 322 can be used to analyze video from the meeting environment to determine that a new speaker is about to speak. Video analysis service 322 can recognize queues such as a meeting participant looking more engaged, or having their mouth open ready to speak, etc. Video analysis service 322 can output a notification of an expected speaker change so that notification urgency service 114 can interject at the next pause (during the speaker change). Alternatively, a notification of an expected speaker change might be used for the opposite purpose—to instruct the notification urgency service 114 to not deliver any non-urgent or normal urgent message because the next speaker appears determined or animated.

Video analysis service 322 can also determine a participants engagement as very engaged or more relaxed and use such conclusions to inform the notification urgency service 114 so that it can decide whether to deliver a message (notification urgency service 114 might delay a notification until the participants do not appear to be in an animated discussion).

Video analysis service 322 might also determine that multiple participants are ready to speak and this can be a queue to delay a notification since multiple people could be speaking at once at the conclusion of the next sentence.

In some embodiments, virtual assistant 102 can also include a visual indicator or control a visual indicator in the meeting environment. Virtual assistant 102 can use a visual indicator as a way to alert the participants in the meeting environment that virtual assistant 102 has a notification to deliver. This can be a way for virtual assistant 102 to raise its hand to be given a space in the conversation to deliver the notification.

Figure 4:
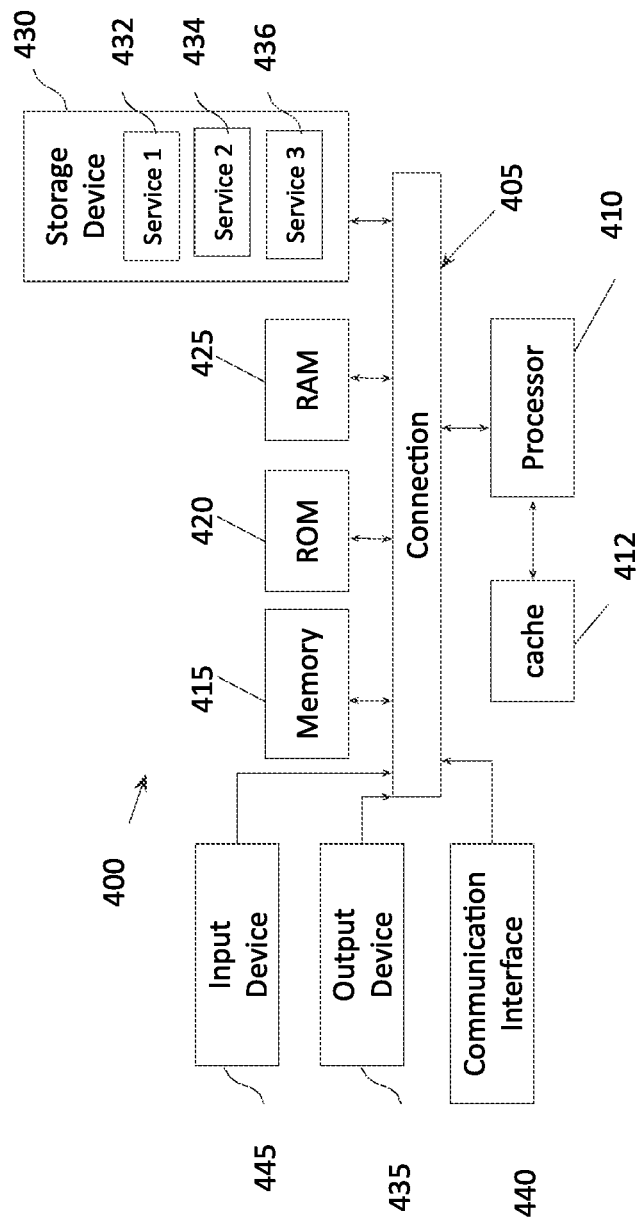
FIG. 4 illustrates an example system configuration of a virtual assistant in accordance with some embodiments of the present technology.

FIG. 4 shows an example of computing system 400, which can be for example any computing device making up virtual assistant 102 or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computing-device readable medium comprising instructions stored thereon, when executed the instructions are effective to cause the computing device to:
   monitor a meeting environment by a voice assistant using default speech parameters;
   analyze a conversation occurring in the meeting environment to determine speech parameters for the conversation among participants of the conversation;
   compare the determined speech parameters for the conversation and the default speech parameters;
   in response to a determination that speech parameters for the conversation are different than the default speech parameters, adjust the default speech parameters of the voice assistant with the determined speech parameters;
   detect a notification trigger corresponding to a notification to be spoken by the voice assistant;
   determine an importance of the notification to be spoken; and
   in response to determining the notification to be spoken is of a normal importance, speak the notification at a pause in the conversation and according to at least one of the determined speech parameters.

2. The non-transitory computing-device readable medium of claim 1 wherein the speech parameters include an average time of pauses between sentences, and pauses between speaker changes.

3. The non-transitory computing-device readable medium of claim 2, wherein the pause is between speaker changes.

4. The non-transitory computing-device readable medium of claim 1 wherein the analysis of the conversation includes natural language processing to recognize sentence structures to indicating a speaker is about to cease speaking.

5. The non-transitory computing-device readable medium of claim 1 comprising instructions effective to cause the computing device to:
   analyze video of the participants in the meeting environment to determine that a new speaker is about speak;
   delay the notification until after the new speaker has spoken.

6. A virtual assistant system comprising:
   a processor; and
   a memory storing instructions which when executed causes the processor to:
   analyze a conversation to determine conversation specific speech parameters;
   store the conversation specific speech parameters in a database;
   compare the determined speech parameters for the conversation and the default speech parameters;
   in response to a determination the conversation speech parameters for the conversation are different than default speech parameters, adjust the default speech parameters with the conversation speech parameters;

detect a notification trigger corresponding to a notification to be spoken;

determine an urgency of the notification; and in response to determining the urgency of the notification is of normal importance, deliver the notification at a pause in the conversation and according to the conversation speech parameters.

7. The virtual assistant system of claim 6, further comprising instructions which when executed by the processor, causes the processor to:

determine a number of occupants in an audible range of the virtual assistant system, wherein the virtual assistant will not provide the notification when no occupants are present in the audible range.

8. The virtual assistant system of claim 7, wherein the virtual assistant will provide notification according to the rules on the urgency notification service based on the number of occupants.

9. The virtual assistant system of claim 7, wherein the audible range of the virtual assistant system includes occupants within a physical conference room and occupants of an online meeting.

10. The virtual assistant system of claim 6, further comprising instructions which when executed by the processor, causes the processor to:

analyze the words spoken in the conversation, wherein the notification urgency service utilizes the output of the audio analysis service to determine when to deliver a notification.

11. The virtual assistant system of claim 6 wherein the speech parameters include an average time of pauses between sentences, and pauses between speaker changes.

12. The virtual assistant system of claim 6, wherein the pause is between speaker changes.

13. The virtual assistant system of claim 6, further comprising instructions which when executed by the processor, causes the processor to:

analyze video of the participants in the meeting environment to determine that a new speaker is about speak, and to delay the notification until after the new speaker has spoken according to the rules associated with the determined urgency of the notification.

14. A method comprising:

monitoring a meeting environment by a voice assistant using default speech parameters;

analyzing a conversation in the meeting environment to determine speech parameters for a conversation in the meeting environment;

compare the determined speech parameters for the conversation and the default speech parameters;

in response to determination speech parameters for the conversation, adjust the default speech parameters of the voice assistant with the determined speech parameters;

detect a notification trigger corresponding to a notification to be spoken by the voice assistant;

determining an urgency of the notification; and in response to determining the urgency is of normal importance, delivering the notification at a pause in the conversation and according to the determined speech parameters.

15. The method of claim 14 comprising:

determining a number of occupants in an audible range of a virtual assistant;

suspending delivery of notifications when no occupants are present in the audible range.

16. The method of claim 14, comprising:

determining a number of occupants in an audible range of a virtual assistant;

providing a notification according to the rules associated with the determined urgency of the notification and the number of occupants.

17. The method of claim 16, wherein the audible range of the virtual assistant includes occupants within a physical conference room and occupants of an online meeting.

18. The method of claim 14 comprising:

analyzing the words spoken in the conversation;

determining when to deliver a notification based on the analysis of the words spoken in the conversation.

19. The method of claim 14 wherein the speech parameters include an average time of pauses between sentences, and pauses between speaker changes.

20. The method of claim 14, comprising:

analyzing video of the participants in the meeting environment to determine that a new speaker is about to speak; and delivering the notification after a currently spoken sentence and prior to the new speaker beginning to speak according to the rules associated with the determined urgency of the notification.

* * * * *